Patented Aug. 27, 1935

2,012,277

UNITED STATES PATENT OFFICE 2,012,277

ARTIFICIAL MASS AND PROCESS OF MAKING THE SAME

Herbert Hönel, Klosterneuburg-Weidling, near Vienna, Austria, assignor to Beck, Koller & Company, Inc., Detroit, Mich., a corporation of Delaware No Drawing. Original application January 2, 1931, Serial No. 506,296, which in turn is a division of application Serial No. 362,460, May 11, 1929. Divided and this application December 19, 1932, Serial No. 647,991. In Austria August 6, 1927

26 Claims. (Cl. 134—26)

The invention relates to a process for producing organic masses of more or less high molecular weight, which may be employed alone or in combination with filling materials as the basis of pressed articles, as binding agents or for preparing varnishes and other coating or impregnating agents and the like.

The present application is a division of my prior application Serial No. 506,296, filed January 2, 1931 now Patent 1,968,080, which latter application is a division of an earlier application Serial No. 362,460, filed May 11, 1929, now Patent No. 1,800,296, which in turn is a continuation in part of my application Serial No. 218,587, filed Sept. 9, 1927, now Patent No. 1,800,295.

The process consists in heating condensation products of low molecular weight, obtained with the aid of alkaline contact agents from such phenolic substances, which possess not more than two particularly reactive positions in the molecule and which, when heated alone change into an infusible condition, to elevated temperatures together with any ester-like chemical substances. The reaction is accompanied with the formation of water and is to be regarded as a condensation reaction.

More particularly the present invention relates to reacting fatty glycerides, drying oils, with heat-hardening condensation products obtained from phenols of the type hereinbefore mentioned in which, however, the substituents are chosen so as to produce oil-soluble condensation products, such substituents according to the present application comprising higher hydrocarbon radicles.

As the particularly reactive positions in a phenol are to be regarded, as is known, the two ortho and the para positions to the phenol-hydroxyl, one of these positions must therefore be occupied by a substituent. Examples of the latter are, a hydrocarbon radical (alkyl, aryl, aralkyl, hydroaromatic radical) or an oxalkyl radical or chlorine. Other substituents have proved to be less suitable. One or both of the meta positions may on occasion also be occupied. The following are examples of a few easily obtainable phenolic bodies of this kind: o- and p-cresol, certain xylenols, carvacrol, thymol, p-tertiary butyl phenol and amyl phenol, p-benzyl phenol, as well as the corresponding derivatives of m-cresol, guaiacol, o- and p-chlorophenol, o- and p-chloro-m-cresol, etc.

Derivatives of the dioxybenzenes, i. e. divalent mononuclear phenolic substances, are also suitable; the conditions, however, are somewhat more complicated and not quite clear. As, moreover, the use of these substances is lacking in economy they will not be further discussed.

On the other hand, the applicability of all those divalent, di-nuclear phenolic substances, which are derivatives of the pp-di-oxy-di-phenylmethane, is to be emphasized. They are easily obtainable and result from the condensation of 2 mols of phenol or certain homologues with 1 mol. of a carbonyl compound with the aid of hydrochloric acid, or, if possible, other acids. In the present case the most suitable phenol homologue is o-cresol, from which di-o-cresylol methane, ethane, propane or butane, is obtained according to whether condensation has been effected with formaldehyde and its homologues or acetone and its homologues. Cyclic ketones may also be employed, in which case, for example, di-o-cresylol cyclohexane or di-o-cresylol methyl-cyclohexane corresponding to the above compounds, are obtained. Phenol, however, may also be used as starting material, and, for example, 2 atoms of chlorine be introduced as substituents, in the di-phenylol compounds thus obtained. In all these cases di-nuclear di-valent phenolic substances are obtained, all of which also possess not more than two reactive positions in the molecule.

It is to be observed that condensation products from phenolic substances with only one particularly reactive position in the molecule may also be employed. Their yield, however, is considerably less and the action only a very limited one, which is in agreement with the fact that, when heated alone, they cannot be converted into the infusible state. Phenols of this kind are, for example, certain xylenols, pseudo-cumenol, creosol, chlor-o-cresol and chlor-p-cresol.

α- and β-naphtol behave in a surprising manner like the last mentioned phenols, although they actually belong to the first mentioned group.

My invention more particularly consists in that where a substantially neutral ester-like body is reacted with a condensation product of the heat-hardening type and of low molecular weight obtained by alkaline condensation from an excess of formaldehyde and a phenolic body, which phenolic body has only two unsubstituted particularly reactive positions, a smooth reaction mass may be obtained, as contrasted with a lumpy mass containing insoluble and infusible particles, such as would result where condensation products of the heat-hardening type are employed, derived from phenols having all three particularly reactive positions unsubstituted.

The mechanism of the reaction very probably is that the molecules of the condensation product do not only react with one another leading to the formation of products of very high molecular weight, but also with the ester-like substance or with its components. The alcoholic hydroxyl groups of the condensation product, known as very reactive, may bring about unions so that multivalent ester components may be in part formed. This possibility in conjunction with the first mentioned reaction may lead to the formation of gelatinous or rubber-like infusible and insoluble but nevertheless homogeneous masses. (Such products are also to be considered as being of infinitely high viscosity.)

Widely varied ester-like substances have proved to be applicable to the reaction. Even low molecular completely crystalloid esters, for example benzoic acid esters of monovalent alcohols, yield according to the proportions employed, thin to highly viscous oils or gelatinous masses. Esters of monovalent alcohols with polyvalent components may yield, even with lesser quantities of the same condensation product, gelatinous end products. The full value of the process, however, is only reached when the ester-like substance is one which is practically non-volatile. Also the preferred esters in the present case, namely fatty oils, are well adapted to yield such gelatinous reaction products together with those condensation products.

Finally it should be again emphasized that esters of every kind may be employed for the reaction. The hydroxyl compound may also be a phenol and the acid an inorganic acid. A condition for the success of the reaction is merely that the condensation product, is soluble in the ester-like substance (at least when hot) before a condensation reaction takes place, as otherwise, of course, no mutual reaction can result. This result is obtained by suitably choosing the substituents in the phenolic substance.

The preparation of the condensation products is effected in known manner, preferably by leaving the phenolic substance or a mixture of several phenols and aqueous formaldehyde together, with at least so much alkali hydroxide, that a clear solution results, if necessary with the aid of alcohol, to react for a long time at room temperature or slightly elevated temperature. The resulting reaction product is then precipitated with acid-reacting agents. Formaldehyde in excess of the equimolecular quantity is with advantage employed for successfully carrying out the further reaction with the ester-like products.

This reaction may be effected in different ways. The quantity of condensation product employed may be such that, if the condensation reaction with the ester were carried to completion an insoluble, rubber-like product would result, in which case the reaction must be interrupted before completion, if necessary even in its initial stage. In this case the solutions of the resulting products yield coatings, which become particularly hard at furnace temperatures. If necessary, driers may also be added to the reaction product. Products of this kind resulting from an interrupted reaction are also particularly suitable for use as plastic masses. They may be employed with or without filling materials for the preparation of various commodities.

An alternative procedure is to employ the condensation product in such a quantity that even on complete condensation with the ester-like product a viscous, resin-like or occasionally wax-like end product is obtained, which more or less approaches the rubber-like condition without actually attaining it. An increase in the colloidal condition such as in viscosity is at least effected. Whether the reaction product obtained is in an insoluble rubber-like condition or whether it is still soluble although occasionally attaining a rubber-like elasticity, therefore depends on whether more or less than a certain maximum proportion of condensation product has been employed. Furthermore, it is evident that when starting from an ester which is already in a high colloidal condition, the rubber-like state is easier attained, i. e. a smaller proportion of condensation product causes this phenomenon than when starting from an ester which is in a low colloidal condition, such as, e. g., from raw oils. In the case of solid, resin-like esters, an increase of their melting point is, as a rule, effected as well. The heating of the product can in this case be carried to about 200–220° C. for any desired time without any noteworthy further increase of the colloidal condition being observed. The still soluble products or their solutions may be employed alone as the basis for paints or, in general, as raw materials for the production of varnishes and other coating masses.

In individual cases very special effects may be obtained by means of the process. Thus, for example, China-wood oil, even when condensed with only a small quantity of a suitable condensation product, loses its known disadvantageous manner of drying. A particularly hard, smooth and rapidly drying varnish may in fact be obtained in this way.

EXAMPLES

*Example 1*

The thick oily condensation product obtained with the aid of alkali from 1 part of p-tertiary-butyl-phenol and 1 part of 30% formaldehyde by heating for 24 hours to 50–55° C. and precipitated with acids is introduced at about 130° C. into 10 parts of China-wood oil with stirring. The temperature is then gradually raised to 220° C. The end product has the viscosity of castor oil and yields with a suitable quantity of siccative and on suitable dilution a varnish of excellent properties which dries clear extremely rapidly.

*Example 2*

A viscous condensation product obtained with the aid of alkali from 30 grms. of thymol and 40 grms. of 30% formaldehyde is introduced into and dissolved in 500 grms. of a moderately boiled mixture of wood oil and linseed oil. This mixture, so-called "honey-oil", is prepared in the usual manner by heating a mixture of 1 part of wood oil and 3 parts of linseed oil for 4 hours at 280° C. It is to be regarded as the mixed glycerine ester of monobasic olefine carboxylic acids and polybasic olefine carboxylic acids obtained by partial polymerization. The temperature is gradually raised whilst stirring. After expelling the mechanically combined water the reaction mixture is clear even when cold. It is finally heated up to 220° C. The product is still soluble and when cold represents a sticky and very ropy mass. On adding a siccative a fairly hard and tough drying varnish is obtained.

*Example 3*

The quantity of honey-oil in the foregoing example is diminished to 300 grms. and the reaction mixture only heated to 160° C.

The highly viscous oil, when suitably diluted, yields a coating agent (binding agent, impregnating agent, etc.), which even without the addition of a siccative or without absorbing oxygen from the air yields on heating to 160-200° C. a tenaciously adhesive coat etc. For this process 1 hour to 10 minutes are required according to the temperature employed. With the addition of siccatives a coat of pre-eminent hardness and resisting power is obtained at this temperature.

In the following claims the expression "soluble artificial masses" is intended to designate bases for coatings of all kinds, particularly varnishes, and bases for impregnating agents, binders and for all sorts of commodities.

In the following claims the term "higher hydrocarbon radical" is to comprise an alkyl group containing at least three carbon atoms or an aralkyl or hydroaromatic group.

What I claim is:

1. A clear homogeneous artificial mass comprising the reaction product of (1) a fatty glyceride and (2) a neutralized heat hardening condensation product obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

2. A clear homogeneous artificial mass permanently soluble in the common varnish solvents, derived from complete reaction between (1) an excess of a fatty glyceride and (2) a neutralized heat hardening condensation product obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

3. A clear homogeneous artificial mass comprising the reaction product of (1) honey oil and (2) a neutralized heat hardening condensation product obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

4. A process for producing clear homogeneous artificial masses which comprises reacting (1) honey oil with (2) a neutralized condensation product capable of undergoing substantial further condensation when heated, which is obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

5. A clear homogeneous artificial mass soluble in the common varnish solvents, comprising (1) a fatty glyceride and (2) a neutralized heat hardening condensation product obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied, said mass yielding a homogeneous insoluble product when subjected to a condensation reaction by the action of heat.

6. A process for producing a homogeneous combination product soluble in the common varnish solvents, which comprises combining (1) a fatty glyceride and (2) a neutralized heat hardening condensation product obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied, said combination product being capable of yielding a homogeneous insoluble mass when subjected to a condensation reaction by the action of heat.

7. A clear homogeneous artificial mass, which is insoluble in the common varnish solvents and which is derived from complete reaction between (1) a fatty glyceride and (2) a neutralized heat hardening condensation product obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

8. A process for producing a homogeneous artificial mass which is insoluble in the common varnish solvents, which process comprises subjecting to heat the still soluble combination product obtained from (1) a fatty glyceride and (2) a neutralized heat hardening condensation product obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

9. A process for producing a homogeneous coat which is insoluble in the common varnish solvents, which process comprises subjecting to the action of heat a still soluble combination product after having been applied as a coat, said combination product having been produced by combining (1) a fatty glyceride and (2) a neutralized heat hardening condensation product obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

10. A clear homogeneous artificial mass comprising the reaction product of (1) a fatty glyceride and (2) a neutralized heat hardening condensation product obtained by maintaining a phenol having a higher hydrocarbon radicle as substituent and only two of the particularly reactive positions (o-, o-, p- to the phenolic group) in the molecule unoccupied, and an excess of formaldehyde over the equimolecular quantity in contact for a prolonged period of time at moderate temperatures in the presence of a strong alkaline catalyst.

11. A process for producing a clear homogeneous artificial mass, which comprises reacting together (1) a fatty glyceride and (2) a neutralized heat hardening condensation product obtained by maintaining a phenol having a higher hydrocarbon radicle as substituent and only two of the particularly reactive positions (o-, o-, p- to the phenolic group) in the molecule unoccupied, and an excess of formaldehyde over the equimolecular quantity in contact for a prolonged period of time at moderate temperatures in the presence of a strong alkaline catalyst.

12. A clear homogeneous artificial mass comprising the reaction product of (1) a fatty glyceride and (2) a neutralized heat hardening condensation product obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied, which reaction product is soluble in the solvents commonly used in the varnish industry if not more than a certain maximum proportion of the condensation product is employed, but insoluble if more than that maximum proportion is employed, said proportion being dependent on the viscosity of the fatty glyceride employed.

13. A process for producing clear homogeneous artificial masses which comprises reacting (1) an excess of a fatty glyceride with (2) a neutralized condensation product capable of undergoing substantial further condensation when heated, which is obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

14. A clear homogeneous artificial mass comprising the reaction product of (1) a fatty oil and (2) a neutralized condensation product capable of undergoing substantial further condensation when heated, which is obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

15. A process for producing clear homogeneous artificial masses comprising reacting (1) a fatty oil and (2) a neutralized condensation product capable of undergoing substantial further condensation when heated, which is obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

16. A clear homogeneous artificial mass comprising the reaction product of (1) a fatty oil of the drying type and (2) a neutralized condensation product capable of undergoing substantial further condensation when heated, which is obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

17. A process for producing clear homogeneous artificial masses comprising reacting (1) a fatty oil of the drying type and (2) a neutralized condensation product capable of undergoing substantial further condensation when heated, which is obtained with the aid of an alkaline catalyst from formaldehyde in excess of the equimolecular quantity and a phenol having a higher hydrocarbon radical as substituent and only two of the particularly reactive positions (o-, o-, p- to the phenolic group) in the molecule unoccupied.

18. A process which comprises (1) reacting together in the presence of a strong alkali a phenol having a higher hydrocarbon radical as substituent and only two particularly reactive positions in the molecule unoccupied, with considerable excess of formaldehyde over the equimolecular quantity, (2) carefully neutralizing the alkaline catalyst, (3) dissolving the thus obtained heat hardening condensation product in an excess of a fatty oil and reacting together these two components by exposure to temperatures of about 160°–220° C., and (4) employing the thus obtained reaction product as base for a varnish.

19. A process which comprises (1) reacting together in the presence of a strong alkali a phenol having a higher hydrocarbon radical as substituent and only two particularly reactive positions in the molecule unoccupied, with considerable excess of formaldehyde over the equimolecular quantity, (2) carefully neutralizing the alkaline catalyst, (3) heating the thus obtained heat hardening condensation product and a fatty oil to about 160° C., and (4) applying the solution of the product thus derived from interrupted reaction between these two components as a coat on a surface and carrying out the condensation reaction by exposing the coat to furnace temperature.

20. A process for producing bases for varnish manufacture and similar purposes which comprises reacting together (1) a drying oil with (2) a neutralized condensation product obtained with the aid of an alkaline catalyst from formaldehyde in excess of the equimolecular proportion with a phenol having in one of its particularly reactive positions a tertiary alkyl radical, and being unsubstituted in the two other particularly reactive positions, the condensation product being capable of undergoing substantial further condensation.

21. A base for varnish manufacture and similar purposes comprising the reaction product (1) a drying oil with (2) a neutralized condensation product obtained with the aid of an alkaline catalyst from formaldehyde in excess of the equimolecular proportion with a phenol having in one of its particularly reactive positions a tertiary alkyl radical, and being unsubstituted in the two other particularly reactive positions, the condensation product being capable of undergoing substantial further condensation.

22. A process for producing soluble artificial masses which comprises reacting (1) China-wood oil with (2) a product obtained by condensing p-tertiary-butyl-phenol and formaldehyde.

23. A soluble artificial mass comprising the reaction product of (1) China-wood oil with (2) a product obtained by condensing p-tertiary-butyl-phenol and formaldehyde.

24. A soluble artificial mass obtained by reacting (1) a boiled mixture of China-wood oil and linseed oil with (2) a product obtained by condensing with formaldehyde a phenol having at the utmost two unsubstituted particularly reactive positions.

25. The process for producing soluble artificial masses which comprises reacting a boiled mixture of China-wood oil and linseed oil with the viscous product obtained by condensing thymol with formaldehyde.

26. A soluble artificial mass obtained by reacting a boiled mixture of China-wood oil and linseed oil with a viscous product obtained by condensing thymol with formaldehyde.

HERBERT HÖNEL.